United States Patent
Liu

(10) Patent No.: US 10,317,275 B2
(45) Date of Patent: Jun. 11, 2019

(54) VIBRATION MONITORING SYSTEMS

(71) Applicant: Simmonds Precision Products, Inc., Vergennes, VT (US)

(72) Inventor: Lei Liu, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 328 days.

(21) Appl. No.: 15/001,280

(22) Filed: Jan. 20, 2016

(65) Prior Publication Data

US 2017/0205275 A1    Jul. 20, 2017

(51) Int. Cl.
*G01M 13/028*    (2019.01)
*G01H 1/00*    (2006.01)

(52) U.S. Cl.
CPC .......... *G01H 1/003* (2013.01); *G01M 13/028* (2013.01)

(58) Field of Classification Search
CPC ................ G01H 1/00; G01M 13/028; G01M 13/00–13/045
See application file for complete search history.

(56) References Cited

U.S. PATENT DOCUMENTS

| | | | | |
|---|---|---|---|---|
| 4,429,578 A * | 2/1984 | Darrel | ...................... | F04C 28/28 340/680 |
| 5,407,265 A * | 4/1995 | Hamidieh | .......... | B23Q 17/0947 340/680 |
| 6,301,572 B1 | 10/2001 | Harrison | | |
| 7,426,426 B2 | 9/2008 | Van Baren | | |
| 2004/0138832 A1 * | 7/2004 | Judd | ....................... | G01H 1/003 702/56 |
| 2005/0096873 A1 | 5/2005 | Klein | | |
| 2009/0301055 A1 * | 12/2009 | Kallappa | ................ | F01D 21/003 60/39.091 |
| 2010/0305886 A1 | 12/2010 | Zhuge | | |
| 2011/0224917 A1 * | 9/2011 | Uluyol | ................ | G01M 13/045 702/34 |
| 2011/0295557 A1 * | 12/2011 | Hedin | ..................... | G01H 1/003 702/183 |
| 2014/0039809 A1 * | 2/2014 | Girondin | .................. | G01H 1/00 702/39 |
| 2015/0260609 A1 * | 9/2015 | Vinod | ................ | F02D 41/1498 702/56 |

FOREIGN PATENT DOCUMENTS

| | | |
|---|---|---|
| CN | 100561162 C | 11/2009 |
| EP | 2365310 A1 | 9/2011 |
| EP | 2963408 A1 | 1/2016 |

OTHER PUBLICATIONS

Extended European Search Report, dated May 19, 2017, in corresponding European Patent Application No. 17151874.9.

* cited by examiner

*Primary Examiner* — Natalie Huls
(74) *Attorney, Agent, or Firm* — Locke Lord LLP; Scott D. Wofsy; Daniel J. Fiorello

(57) ABSTRACT

A method for determining an operational condition of a vibratory system, comprising receiving vibration signals from one or more sensors associated with the vibratory system preprocessing the vibration signals to remove known noise to create a preprocessed signal, processing the preprocessed signal in both a time domain and a frequency domain to create time domain data and frequency domain data, respectively, and fusing the time domain data and the frequency domain data to determine the existence of abnormal operations.

14 Claims, 1 Drawing Sheet

VIBRATION MONITORING SYSTEMS

BACKGROUND

1. Field

The present disclosure relates to systems and methods of vibration based monitoring and diagnostics, specifically to vibration monitoring for compressor systems.

2. Description of Related Art

Traditional vibration monitoring technologies for mechanical diagnostics (e.g., for compressors, gas turbines, turbomachinery or other rotating machinery systems), particularly in health and usage management systems (HUMS), largely depend on the measurement of vibration amplitudes. With the underlying assumption that the system under monitoring is stationary, absolute amplitudes associated with a frequency band, directly or implicitly after certain signal processing methods, e.g., envelope analysis, are used as fundamental building blocks to establish indicators.

Unfortunately, the assumption doesn't hold true in many real-world applications, particularly in the area of the compressor systems. Significant variations in amplitude measurements can be expected and are often attributed as "noises", regardless of changes in operation conditions. To prevent these so called noises from overwhelming the results, efforts are made to either change the way to data is collected (e.g., by using time-synchronous averaging by assuming cycle-stationary) or the way data is interpreted (e.g., by using statistics in the hope of minimizing false alarms). While these efforts can be useful in particular contexts, such efforts are based on another layer of assumptions and cannot be adapted to differentiate changes in operational conditions.

Another fundamental difficulty in using amplitudes is the identification of characteristic frequencies. In vibration from compressor systems, a few characteristic frequencies, e.g., blade passing, can be approximately identified as they closely resemble similar speed dependent characteristics found in gear box systems. Other vibration frequencies associated with rotor-dynamic instabilities, however, do not simply have fixed relationships to speed. From the viewpoint of condition monitoring, the latter ones can be of more importance as they are strongly correlated to abnormal operations to be detected.

There is a need in the art for improved vibration monitoring systems to enhance the capability of detecting abnormal operations of compressor systems of interest. Specifically, there is a need for methods, devices, and systems to reliably detect dynamic instability during online operations of compressor systems through vibration. The present disclosure provides a solution for this need.

SUMMARY

A method for determining an operational condition of a vibratory system, comprising receiving vibration signals from one or more sensors associated with the vibratory system preprocessing the vibration signals to remove known noise to create preprocessed signals, processing the preprocessed signals in both time domain and frequency domain to create time domain data and frequency domain data, respectively, and fusing the time domain data and the frequency domain processed data to determine the existence of abnormal operations.

Receiving the vibration signals from the sensors can include receiving vibration signals from one or more accelerometers. Preprocessing can include an analog-to-digital conversion of the vibration signal.

Preprocessing can include passing the vibration signal through one or multiple analog and/or digital filters to remove known noise. In certain embodiments, preprocessing can include removing vibration from one or more external sources that are coupled to the vibratory system.

Preprocessing can include removing frequencies beyond designed synchronous speed band when there are multiple high order harmonics. Preprocessing can include decimation to reduce an amount of data for processing.

Processing in the time domain can include performing kurtosis on the preprocessed signal. Processing in the frequency domain can include determining a spectral bandwidth of the preprocessed signal. The processed results may be directly used to be compared with predetermined thresholds to determine the operational condition of the vibratory system of interests.

In certain embodiments, fusing the processed data includes weighting the time domain data against the frequency domain data based on one or more predetermined conditions. Fusing the data includes applying weights to the time domain data and the frequency domain data to obtain generalized data based on a priori data. In certain embodiments, the generalized data can be compared with a predetermined threshold to determine the operational condition of the vibratory system.

In certain embodiments, receiving signals from the one or more sensors can include receiving signals from a plurality of sensors placed at different physical locations in/on the vibratory system, wherein fusing the processed data from the plurality of sensors includes applying a weight matrix to the processed data to obtain generalized data based on a priori data of one or more portions of the vibratory system.

A vibration monitoring system for determining an operational condition of a vibratory system includes one or more sensors configured to output a vibration signal, a preprocessing module operatively connected to the sensors to receive and preprocess the vibration signal, the preprocessing module configured to output a preprocessed signal, a time processing module operatively connected to the preprocessing module to receive the preprocessed signal and to output time domain data, a frequency processing module operatively connected to the preprocessing module to receive the preprocessed signal and to output a frequency domain data, and a data fusion module operatively connected to the time processing module and the frequency processing module to receive the time domain data and the frequency domain data, wherein the data fusion module is configured to combine the time domain data and frequency domain data to determine the operational condition of the vibratory system.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
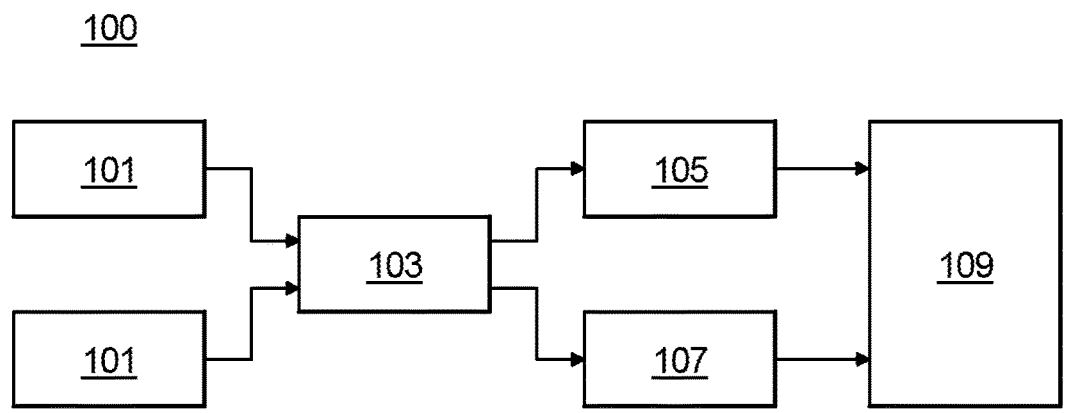
FIG. 1 is a schematic diagram of an embodiment of a system in accordance with this disclosure.
Figure 2:
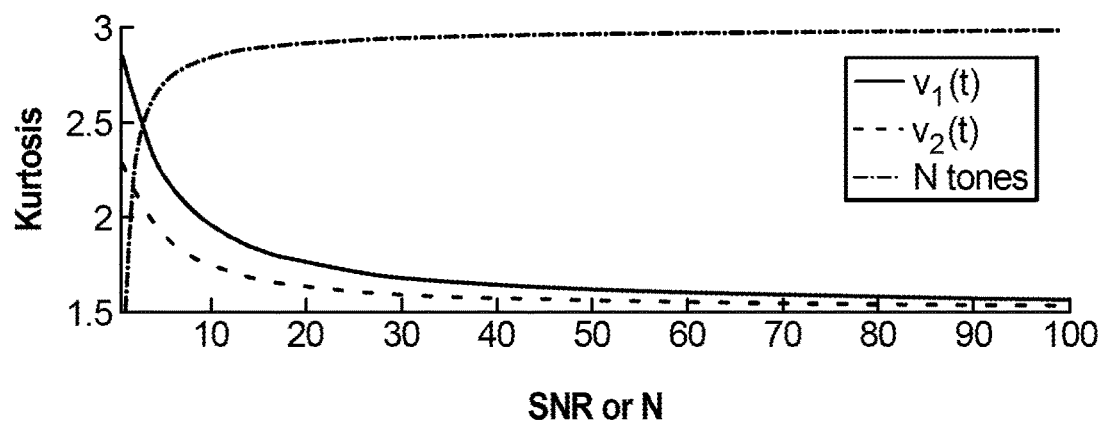
FIG. 2 is a illustrative chart of kurtosis as a function of vibration signal to noise ratio, and functions of vibration signals with numbers of dominate tones in accordance with embodiments of this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to monitor an operational condition of a vibratory system.

In the context of compressor systems, operational conditions (e.g., speeds, flow rates, compression ratios and many other factors) can vary significantly. These varying operational conditions can introduce a wide range of loading conditions to the structures that one or more sensors (e.g., accelerometers) are attached to. Combined with aerodynamic forces that reach the sensors (e.g., the accelerometers) in similar ways, violent loadings make absolute amplitudes of vibrations measured externally have violent changes. These changes, or large variances in mathematical sense, are most likely to be large enough to smear differences between normal and abnormal operations. For example, vibration amplitudes from an imbalanced shaft spinning at a low speed and those from a well-balanced one at a high speed may be the same. Due to the increase of centrifuge force, relying on absolute amplitudes may not be able to differentiate the two cases, or even yield different results.

In general, the dynamic behavior of compressor systems subjected to uncertain dynamic excitations under abnormal operations can be described through random processes. The probabilistic characterization of these random processes can be extremely complex because non-stationary and/or non-Gaussian input processes are involved. However, this can be used as an advantage to detect abnormal operational conditions (e.g., in compressors) by measuring randomness in vibration. As described herein, approaches to measure randomness are developed in both time domain and frequency domain to detect abnormal operations.

Referring to FIG. 1, an embodiment of a vibration monitoring system 100 for determining an operational condition of a vibratory system includes one or more sensors 101 configured to output a vibration signal. The sensors 101 can include an accelerometer or any other suitable sensor. In embodiments with multiple sensors 101, it is contemplated that the sensors 101 may be installed at different physical locations in/on the vibratory system of interest (e.g., in different acceleration sensing directions).

A preprocessing module 103 is operatively connected to the sensors 101 to receive and preprocess the vibration signal therefrom. In certain embodiments, the preprocessing module 101 can include an analog to digital converter, one or more filters, and/or a decimator. Any other suitable preprocessor is contemplated herein. The preprocessing module 103 is configured to output a preprocessed signal.

A time processing module 105 is operatively connected to the preprocessing module 103 to receive the preprocessed signal and to output time domain data. The time processing module 105 can be configured to execute any suitable time domain signal processing method (e.g., as described hereinbelow).

A frequency processing module 107 is also operatively connected to the preprocessing module 105 to receive the preprocessed signal and to output a frequency domain data. The frequency processing module 107 can execute any suitable frequency domain signal processing method (e.g., as described hereinbelow).

The system 100 includes a data fusion module 109 operatively connected to the time processing module 105 and the frequency processing module 107 to receive the time domain data and the frequency domain data. The data fusion module 109 is configured to combine the time domain data and frequency domain data to determine the operational condition of the vibratory system.

While it is shown that multiple sensors 101 connect to a single system 100, it is contemplated that a combination of a single sensor 101 and modules 103, 105, and 107 may form a stand-alone unit and be separate from data fusion module 109. In such an example, multiple of such units may be used to provide processed results to a single module 109 to form a complete system 100. Any other suitable compartmentalization and/or combination (e.g., physically, electrically, or digitally) of any portion of system 100 and/or sensors 101 is contemplated herein.

One or more portions of system 100 can include a microprocessor, a memory, and/or any other suitable hardware (e.g., computer hardware) or software. For example, it is contemplated that the modules 103, 105, 107, 109 can all be implemented as software, however, any suitable analog or digital hardware or software is contemplated herein. Also, system 100 may be operatively connected to a controller (not shown) which controls one or more operating parameters of the vibratory system (e.g., rotational speed of a compressor) to modify inputs to the vibratory system as a function of the determined operational condition of the vibratory system.

Vibration signals from one or more sensors 101 (e.g., accelerometers) are first collected from the vibratory system being monitored and then processed through a preprocessing stage (e.g., using preprocessing module 103). The preprocessing stage may include an analog-to-digital conversion, analog or digital filtering to remove known noises (e.g., vibration from external sources that are outside of the vibratory system but coupled to the vibratory systems through connected structures, frequencies beyond designed synchronous speed band where there are multiple high order harmonics). The preprocessing stage may also include decimation to reduce the amount of data for further processing.

After the preprocessing, both a time processing method and a frequency processing method, embodiments of which are described below, are applied to the vibration data (e.g., to calculate corresponding indicators). As is appreciated by those skilled in the art from this disclosure, a data fusion stage can then use the indicators as inputs and determines the existence of abnormal operations.

In an embodiment of a time domain method, kurtosis is used to directly measuring vibration signals in time domain. The sample kurtosis is defined as the $4^{th}$ standardized moments as, $$Ku = \frac{E[(v - E[v])^4]}{E[(v - E[v])^2]^2} \tag{1}$$

where v or v(t) is the time domain vibration signal, and E[ ] is the expectation operator. Kurtosis is a descriptor of the shape of a probability distribution and is commonly regarded as a measure of tailedness of data. For reference, normal distribution has a kurtosis equaling to 3, and uniform distribution has a kurtosis equaling to 1.8.

The underlying fact that kurtosis can be used to detect abnormal operations is that, after preprocessing, vibration under normal operations is dominated by a frequency component synchronous to the rotation speed. Mathematically, the time domain signal can be modeled as, $v_1(t)=s(t)+n(t)=A \cos(\omega_s t)+n(t)$, where A is the vibration amplitude, $\omega_s$ is the angular speed and $n(t) \sim N(0,B^2)$ is the additive Gaussian noise. The kurtosis of $v_1(t)$ is $(1.5r^2+12r+12)/(r+2)^2$, where $r=A^2/B^2$ or equally the signal-to-noise ratio (SNR). As illustrated by the solid line in FIG. 2, the kurtosis converges to 1.5 when SNR is large and has an upper limit of 3 if SNR approaches zero. With proper accelerometer installation and filtering in the preprocessing stage, the kurtosis can be restricted to a certain value as a function of SNR.

With the emergence of large sub-synchronous vibration, one or more additional frequency components will appear in the sub-synchronous band. For instance, a vibration signal can be written as $v_2(t)=s(t)+e(t)=A \cos(\omega_s t)+B \cos(\omega_e t)$ where the noises term is replaced by $e(t)=B \cos(\omega_e t)$, and represents that only one extra sub-synchronous component is significant. With SNR redefined to be the ratio of power between the two components, the kurtosis of $v_2(t)$ can be calculated as $(1.5r^2+6r+1.5)/(r+1)^2$ and illustrated by the dotted line in FIG. 2. The kurtosis now has lower and upper limits at 1.5 and 2.25 respectively. It is appreciated by those skilled in the art that the formulation can be further extended to the case in which N significant components with identical amplitude exist. As shown in the dash-dotted line, the kurtosis for such cases asymptotically approaches 3 from its starting point of 1.5. The convergence of the kurtosis to 3 when N increases agrees with that from the first case with decreasing SNR because of, in this case, the disappearance of dominate tones.

When impulsive forces (e.g., from one or more blades impacting and rubbing against their nearby walls in a compressor system) are present, vibration signal can no longer be modelled by the equations above. In particular, the amplitude A or B is no longer stationary. This is not only because the impulsive forces have large time/condition dependent variations in the sense of applying loadings to the affected structures, but also because the quick dissipation of energies through the structures that vibrations propagate through. Effectively, vibrations are likely to have amplitudes modulated, possibly with fast rising but slow decaying envelopes if they are well separated, but neither the amplitude nor frequency is mathematically traceable since the modulation occurs truly in a random fashion. From the perspective of signal distribution in time domain, vibrations due to these combined effects can be seen to have heavy tails that are distinguishably different from true random vibrations. As a result, kurtosis can be a very useful to detect abnormal operations of compressor systems by comparing it with a threshold set well above 3.

In an embodiment of a frequency domain method, spectral bandwidth can be used to characterize vibration profiles and build on top of spectral moments. The $n^{th}$ spectral moment is defined as, $$m_n = \int_{-\infty}^{\infty} \omega^n S(\omega) d\omega \quad (2)$$

where $\omega$ is the angular frequency, $S(\omega)$ is the power spectrum of a random signal under examination. Assuming the signal is centered adjusted to have a zero mean, the average number of up-zero-crossing in a unit time, $\Omega_0$, quantifies the average frequency of the signal. Similarly, another statistic to characterize the signal is the average number of maxima-crossing in a unit time, $\Omega_m$. This can be calculated by estimating the average frequency of a differentiated version of the original signal. These two quantities can be obtained by using the first three even-order spectral moments as, $$\Omega_0 = \sqrt{m_2/m_0} \quad \Omega_m = \sqrt{m_4/m_2} \quad (3)$$

Subsequently, the spectral bandwidth can be defined as a normalized version of difference between the up-zero-crossing frequency and maxima-crossing frequency as, $$SB = \sqrt{\frac{\Omega_m^2 - \Omega_0^2}{\Omega_m^2}} = \sqrt{1 - \frac{m_2^2}{m_0 m_4}} \quad (4)$$

It should be noted that $\Omega_m$ is always larger than $\Omega_0$ for any process such that the inner part under the square root is always positive. The normalization with respect to $\Omega_m$ scales the difference such that the spectral bandwidth is always a positive number being bounded between 0 and 1.

The two extreme values of the spectral bandwidth are corresponding to an ideal noiseless signal with a single frequency component and an ideal signal with only white noises, respectively. For other signals, the spectral bandwidth takes a value in-between. In particular, for a bandlimited white noise signal, the spectral bandwidth can be expressed as sqrt$\{1-5(r^3-1)^2/[9(r-1)(r^5-1)]\}$ where r is the ratio between the upper and lower boundaries of the pass band.

Following the similar models as previously discussed, the range of spectral bandwidth under different situations can be quantified. Without losing generality, in certain embodiments, identical amplitudes for emerging frequency components in sub-synchronous band can be assumed to facilitate analysis. Accordingly, the spectral bandwidth with N sub-synchronous components can be written as, $$\sqrt{1 - \frac{1}{N+1} \frac{\left(1+\sum_N r_n^2\right)^2}{1+\sum_N r_n^4}},$$

where $r_n$ is the ratio of frequency between the highest component and $n^{th}$ sub-synchronous component. This is an N-dimensional function, however, the analysis of function limits can be focused on the part of $1/(N+1)$ as the rest of the fraction component is bounded between 1 and 1+N. Consequently, the limit of equation may be written as, $$\sqrt{N/(N+1)}.$$

For detecting sub-synchronous vibration, this limit may give guidance on determining a threshold by considering two particular cases in which N equals 1 and N equals 2, and spectral bandwidth is calculated as about 0.7071 and about 0.8165, respectively.

For content rich frequency responses resulted from impulsive forces under impacting and rubbing, the spectral bandwidth is naturally converging towards one as vibration signal approaches to random. This can be also explained using the limit above as N increases towards infinite.

As opposed to measuring and comparing absolute amplitudes of vibrations on top of which traditional monitoring approaches are built, measuring spectral bandwidth eliminates the need of baseline and thus associated uncertainties.

This is particularly meaningful considering, e.g., that baseline tests usually cannot fully cover entire real-world operational conditions, and measurement system drifts. The above described approach is also not sensitive to the exact locations of emerging frequency components as those traditional approaches. The fundamental difficulties in tuning measuring band and ambiguity in interpreting amplitude based thresholds are therefore offset.

In comparison to the time domain method, e.g., the kurtosis, the frequency domain method can be more robust in detecting sub-synchronous vibrations due to its insensitivity to the change of vibration amplitudes. This is because the kurtosis implies the assumption on signal's stationary in time domain. An example to demonstrate a possible faulty result is by considering a single component sinusoidal function amplitude modulated by a linear function. In this example, the corresponding kurtosis will be no longer close to 1.5 but increase toward 3 due to increased tailedness in data distribution. Due to this, the time domain method may be limited to be used for detecting situation where impulsive forces exist.

While it is contemplated that either above described method could be used independently of the other, data fusion can be performed to integrate the results from both time and frequency domain methods from one or more sensors (e.g., accelerometers). This integrated data can be utilized to determine the operational condition of the vibratory system. An alarm can be raised when the vibratory system being monitored is abnormally operating.

Such data fusion (e.g., of signals from a plurality of sensors under one or more of time domain or frequency domain) can determine the true condition of the vibratory system by eliminating potential measurement noises and estimating interdependence from spatially distributed sensors (e.g., accelerometers) to encompass system complexity. For instance, multiple sections with varying number and configurations of mechanical components, e.g. bearings, may exist in a compressor system. Surge or rubbing may occur at one or all of these sections, rendering increased possibility of misdetection or false alarms if only the results from a single location are used.

In certain embodiments, a weighting mechanism/method can be utilized. That is, results from both time domain and frequency domain methods can be first calculated using signals collected from sensors (e.g., accelerometers located at multiple locations of a compressor system). 2-D weighted sums can then be obtained by using the results in order to obtain a generalized result. For example, to circumvent the issue of kurtosis sensitivity to non-stationary sub-synchronous vibration, results from the time domain methods may be given less weight in determining sub-synchronous vibration but be given equal or higher weights when used to determine impacting and rubbing. Yet another example is that results from a sensor (e.g., an accelerometer) at a particular location and direction may be given more weight in the voting. Any other suitable methods in data fusion can be utilized (e.g., fuzzy-logic, probabilistic framework) as appreciated by those skilled in the art.

As described above, vibrations can be collected from a vibratory system and measured for randomness as indicators of normal/abnormal status of the system. The methods and associated systems as described above significantly differ from prior techniques by not relying on absolute amplitudes and frequency locations. Embodiments extract vibration signature from a view point of random process, therefore embodiments do not rely on the assumption of stationary process as traditional techniques do. Also, embodiments do not require subtle parameters and/or thresholds tuning, and are able to detection abnormal operations of compressor systems in a much more accurate and reliable way.

The methods and systems of the present disclosure, as described above and shown in the drawings, provide for vibration monitoring systems with superior properties including improved accuracy. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A vibration monitoring system for determining an operational condition of a vibratory system, comprising:
   one or more sensors configured to output a vibration signal;
   a preprocessing module operatively connected to the sensors to receive and preprocess the vibration signal, the preprocessing module configured to output a preprocessed signal;
   a time processing module operatively connected to the preprocessing module to receive the preprocessed signal and to output time domain data;
   a frequency processing module operatively connected to the preprocessing module to receive the preprocessed signal and to output a frequency domain data, wherein the frequency processing module processes the preprocessed signal in the frequency domain, wherein processing in the frequency domain includes determining a spectral bandwidth (SB) of the preprocessed signal, the spectral bandwidth is normalized and is determined by $$SB = \sqrt{\left(\frac{N}{N+1}\right)},$$

wherein N is the number of sub-synchronous components to the spectral bandwidth, wherein the spectral bandwidth converges toward 1 as vibration signals approach random; and
   a data fusion module operatively connected to the time processing module and the frequency processing module to receive the time domain data and the frequency domain data, wherein the data fusion module is configured to combine the time domain data and frequency domain data to determine the operational condition of the vibratory system; and
   an alarm configured to be operated when existence of an abnormal operational condition of the vibratory system is determined.

2. A method for determining an operational condition of a vibratory system, comprising:
   receiving vibration signals from one or more sensors associated with the vibratory system preprocessing the vibration signals to remove known noise to create a preprocessed signal;
   processing the preprocessed signal in both a time domain and a frequency domain to create time domain data and frequency domain data, respectively;
   and fusing the time domain data and the frequency domain data to determine the existence of abnormal operations, wherein processing in the frequency domain includes determining a spectral bandwidth (SB) of the preprocessed signal, the spectral bandwidth is normalized and is determined by $$SB = \sqrt{\left(\frac{N}{N+1}\right)},$$

wherein N is the number of sub-synchronous components to the spectral bandwidth, wherein the spectral bandwidth converges toward 1 as vibration signals approach random; and operating an alarm when the existence of abnormal operations is determined.

3. The method of claim 2, wherein receiving the vibration signals from the sensors includes receiving vibration signals from one or more accelerometers.

4. The method of claim 2, wherein preprocessing includes an analog-to-digital conversion of the vibration signal.

5. The method of claim 2, wherein preprocessing includes passing the vibration signal through one or multiple analog and/or digital filters to remove known noise.

6. The method of claim 2, wherein preprocessing includes removing vibration from one or more external sources that are coupled to the vibratory system.

7. The method of claim 2, wherein preprocessing includes removing frequencies beyond designed synchronous speed band when there are multiple high order harmonics.

8. The method of claim 2, wherein preprocessing includes decimation to reduce an amount of data for processing.

9. The method of claim 2, wherein processing in the time domain includes performing kurtosis on the preprocessed signal.

10. The method of claim 2, wherein fusing the data includes weighting the time domain data and the frequency domain data based on one or more predetermined conditions.

11. The method of claim 10, wherein fusing the data includes applying weights to the time domain data and the frequency domain data to obtain generalized data.

12. The method of claim 11, further comprising comparing the generalized data with a predetermined threshold to determine the operational condition of the vibratory system.

13. The method of claim 10, wherein fusing the data includes applying weights to the time domain data and the frequency domain data based on a priori data.

14. The method of claim 2, wherein receiving signals from the one or more sensors can include receiving signals from a plurality of sensors placed at different physical locations in/on the vibratory system, wherein fusing the processed data from the plurality of sensors includes applying a weight matrix to the processed data to obtain generalized data based on a priori data of one or more portions of the vibratory system.

* * * * *